(12) United States Patent
Huang

(10) Patent No.: US 11,664,700 B2
(45) Date of Patent: May 30, 2023

(54) CANNED MOTOR DEVICE

(71) Applicant: ZI YI ELECTRICAL ENGINEERING CO., LTD., Taichung (TW)

(72) Inventor: Ting-Tsai Huang, Taichung (TW)

(73) Assignee: ZI YI ELECTRICAL ENGINEERING CO., LTD., Taichung (TW)

( * ) Notice: Subject to any disclaimer, the term of this patent is extended or adjusted under 35 U.S.C. 154(b) by 177 days.

(21) Appl. No.: 17/355,697

(22) Filed: Jun. 23, 2021

(65) Prior Publication Data
US 2022/0416609 A1    Dec. 29, 2022

(51) Int. Cl.
*H02K 5/10*    (2006.01)
*G01M 3/40*    (2006.01)
*F04D 13/06*   (2006.01)

(52) U.S. Cl.
CPC ........... *H02K 5/10* (2013.01); *F04D 13/0606* (2013.01); *G01M 3/40* (2013.01)

(58) Field of Classification Search
CPC .. H02K 7/00; H02K 7/14; H02K 5/00; H02K 5/12; H02K 5/128; H02K 11/00; H02K 11/20; H02K 9/00; H02K 9/19; H02K 9/193; H02K 9/197; G01R 31/00; G01R 31/34; G01R 31/52
See application file for complete search history.

(56) References Cited

U.S. PATENT DOCUMENTS

| | | | |
|---|---|---|---|
| 7,249,939 B2 * | 7/2007 | Yanagihara | F04D 29/026 417/420 |
| 2004/0013546 A1 * | 1/2004 | Klein | H02K 5/128 417/420 |
| 2013/0115118 A1 * | 5/2013 | Chien | F04D 13/0633 417/420 |

* cited by examiner

*Primary Examiner* — Ahmed Elnakib
*Assistant Examiner* — Leda T Pham
(74) *Attorney, Agent, or Firm* — Lando & Anastasi, LLP

(57) ABSTRACT

A canned motor device includes a casing, a rear cover and a leak detector. The rear cover has a main body portion having a cover end wall, and an extended disk portion cooperating with the main body portion to define an accommodating space. The casing and the rear cover cooperatively define an annular groove, a liquid-receiving space and a plurality of guiding grooves therebetween. The leak detector is disposed on one side of the cover end wall opposite to the liquid-receiving space for detecting a change in electrostatic capacity between the leak detector and the liquid-receiving space. The annular groove communicates with the liquid-receiving space, the accommodating space and each of the guiding grooves.

3 Claims, 6 Drawing Sheets

CANNED MOTOR DEVICE

FIELD

The disclosure relates to a canned motor device, and more particularly to a canned motor device with leak prevention measures.

BACKGROUND

A conventional canned motor device (hereinafter also referred to as "the first canned motor device") disclosed in Taiwanese Patent No. I424661 includes a front cover, a support frame, an impeller, a cup-shaped rear cover, an inner rotor, an outer rotor, a shaft and a handling frame. The rear cover has a double-layered structure, and includes an inner lining made of a fluoroplastic material, and a reinforced layer.

The inner lining and the reinforced layer abut against one another to form the double-layered structure of the rear cover. As such, when the first canned motor device is used in a piece of chemical processing equipment, if the inner lining is damaged, chemical liquid may leak through a crack in the inner lining into the gap between the inner lining and the reinforced layer. However, the leakage through the inner lining may not be detected by the first canned motor device, which may allow the chemical liquid to leak further into the outer rotor and corrode the outer rotor. As a result, the first canned motor device could malfunction.

Another conventional canned motor device (hereinafter also referred to as "the second conventional canned motor device") disclosed in Taiwanese Patent No. M600801 includes a base unit, a motor unit and a leak detection sensor. The base unit includes a fixed seat. The motor unit includes a rotor, a first casing body, a second casing body and a stator. The first casing body surrounds the rotor. The second casing body is sleeved on the first casing body. The stator surrounds the second casing body and is surrounded by the fixed seat. The first casing body has a first surrounding wall and a first side wall. The first surrounding wall surrounds the rotor and has two ends opposite to each other along an axis The first side wall is connected to one of the ends of the first surrounding wall and cooperates with the first surrounding wall to define an accommodating space that opens at the other one of the ends of the first surrounding wall for accommodating the rotor therein. The second casing body has a second surrounding wall and a second side wall. The second surrounding wall surrounds the first surrounding wall and is surrounded by the stator. The second side wall is connected to the second surrounding wall. The leak detection sensor is mounted to the second casing body and includes a sensor module. The sensor module is configured to detect a change in electrostatic capacity between the second side wall and the first side wall caused by leakage of chemical liquid.

Even though the second canned motor device is capable of detecting the leakage of the chemical liquid, the leakage may not be instantly detected if the crack where the chemical liquid leaks through is not close enough to the sensor module. Furthermore, in the second canned motor device, the gap between the first casing body and the second casing body may be too narrow, so the flow of the chemical liquid is obstructed, thereby preventing the leaked chemical liquid from reaching the sensor module, which will prevent the timely detection of the leakage.

SUMMARY

Therefore, an object of the disclosure is to provide a canned motor device that can alleviate the drawbacks of the prior arts.

According to the disclosure, the canned motor device includes a tubular base, a motor unit, a rear cover, a leak detector and a front cover. The tubular base extends along and surrounds an axis to define a mounting space therein. The motor unit is mounted in the mounting space and includes a casing, a stator, a rotor and an impeller. The casing has a casing body and a flange portion. The flange portion is connected to one end of the casing body and is fixedly mounted to the tubular base. The stator is sleeved on the casing. The rotor is mounted in the casing body. The impeller is driven by the rotor. The rear cover is mounted between the casing and the tubular base, and has a main body portion and an extended disk portion. The main body portion is disposed between the casing body and the stator, and has two opposite ends in a direction of the axis. The extended disk portion extends from one of the opposite ends of the main body portion. The main body portion and the extended disk portion cooperatively define an accommodating space which opens at the one of the opposite ends and in which the casing body is disposed. The main body portion has an end wall and a surrounding wall. The end wall is located at the other one of the opposite ends. The surrounding wall surrounds the axis and extends from a periphery of the end wall to the extended disk portion. The end wall and the casing cooperatively define an annular groove that surrounds the axis, and a liquid-receiving space therebetween. The rear cover and the casing cooperatively define a plurality of guiding grooves therebetween that are disposed about the axis and that are spaced apart from each other. Each of the guiding grooves extends from the surrounding wall to the end wall. The annular groove and each of the guiding grooves intersect. The annular groove communicates with the liquid-receiving space, the accommodating space, and each of the guiding grooves. The leak detector is disposed on one side of the end wall that is opposite to the liquid-receiving space for detecting a change in electrostatic capacity between the liquid-receiving space and the leak detector. The front cover is positioned on the tubular base and covers the impeller.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
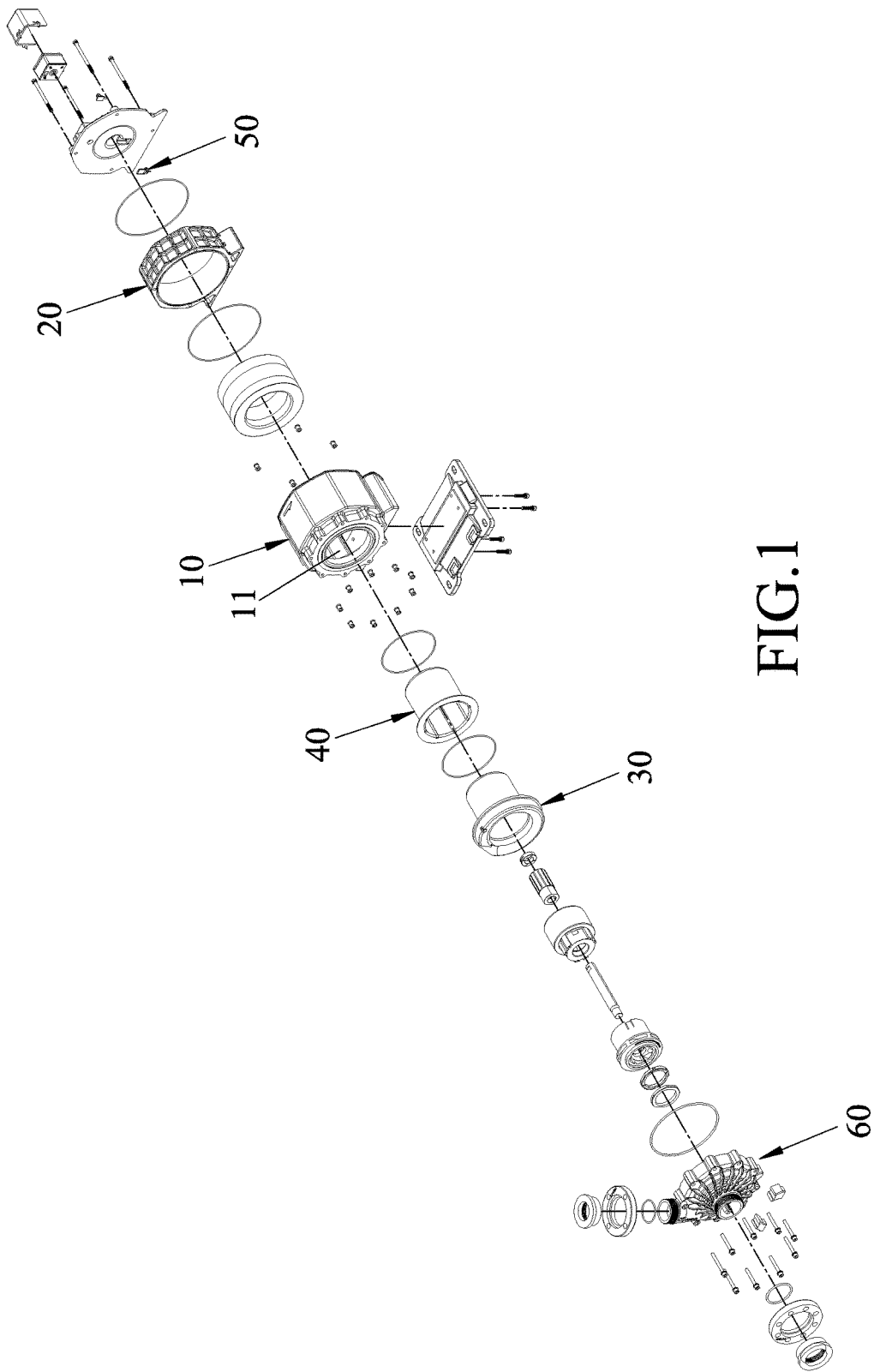
FIG. 1 is an exploded perspective view of an embodiment of a canned motor device according to the disclosure.

Referring to FIGS. 1, and 4 to 6, an embodiment of a canned motor device according to the disclosure includes a tubular base 10, a motor unit 30, a rear cover 40, a leak detector 50 and a front cover 60.

The tubular base 10 extends along and surrounds an axis (L) to define amounting space 11 therein. In this embodiment, the tubular base 10 may be made of a plastic material such as polypropylene (PP), glass fiber reinforced polypropylene (GFRPP), polyvinylidene difluoride (PVDF) and carbon fiber filled ethylene tetrafluoroethylene (CFRETFE).

The motor unit 30 is mounted in the mounting space 11 and includes a casing 31, a stator 32, a rotor 33 and an impeller 34. The casing 31 has a casing body 311, and a flange portion 312 connected to one end of the casing body 311 and fixedly mounted to the tubular base 10. The stator 32 is sleeved on the casing 31. The rotor 33 is mounted in the casing body 311. The impeller 34 is driven by the rotor 33. In this embodiment, the motor unit 30 is a canned motor and further includes a center shaft 35 serving as a rotating shaft of the rotor 33. The casing body 311 has a casing end wall 313 and a casing surrounding wall 314 extending from a periphery of the casing end wall 313 to the flange portion 312. The casing end wall 313 has an annular wall segment 315 on which the center shaft 35 is mounted.

Figure 2:
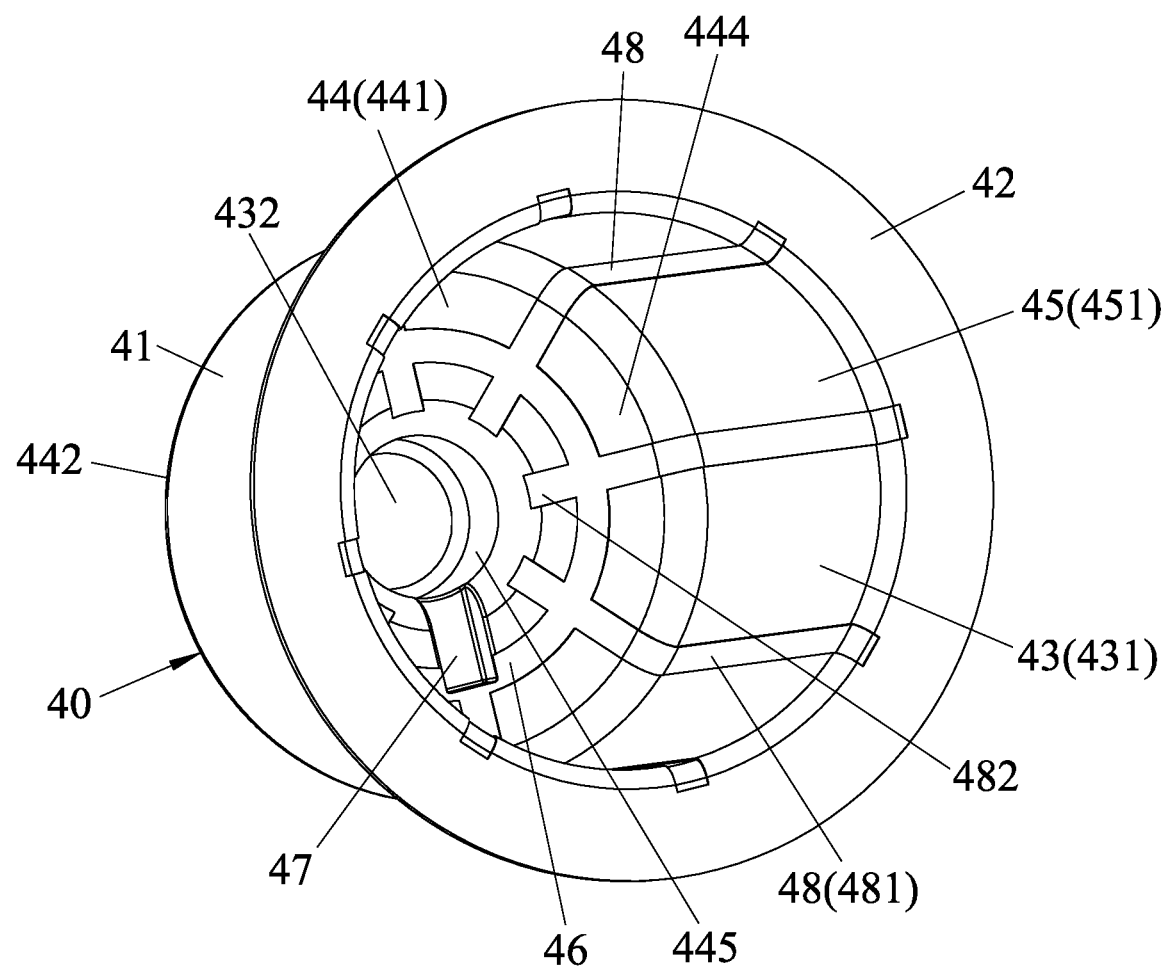
FIG. 2 is a perspective view of a rear cover of the embodiment.
Figure 3:
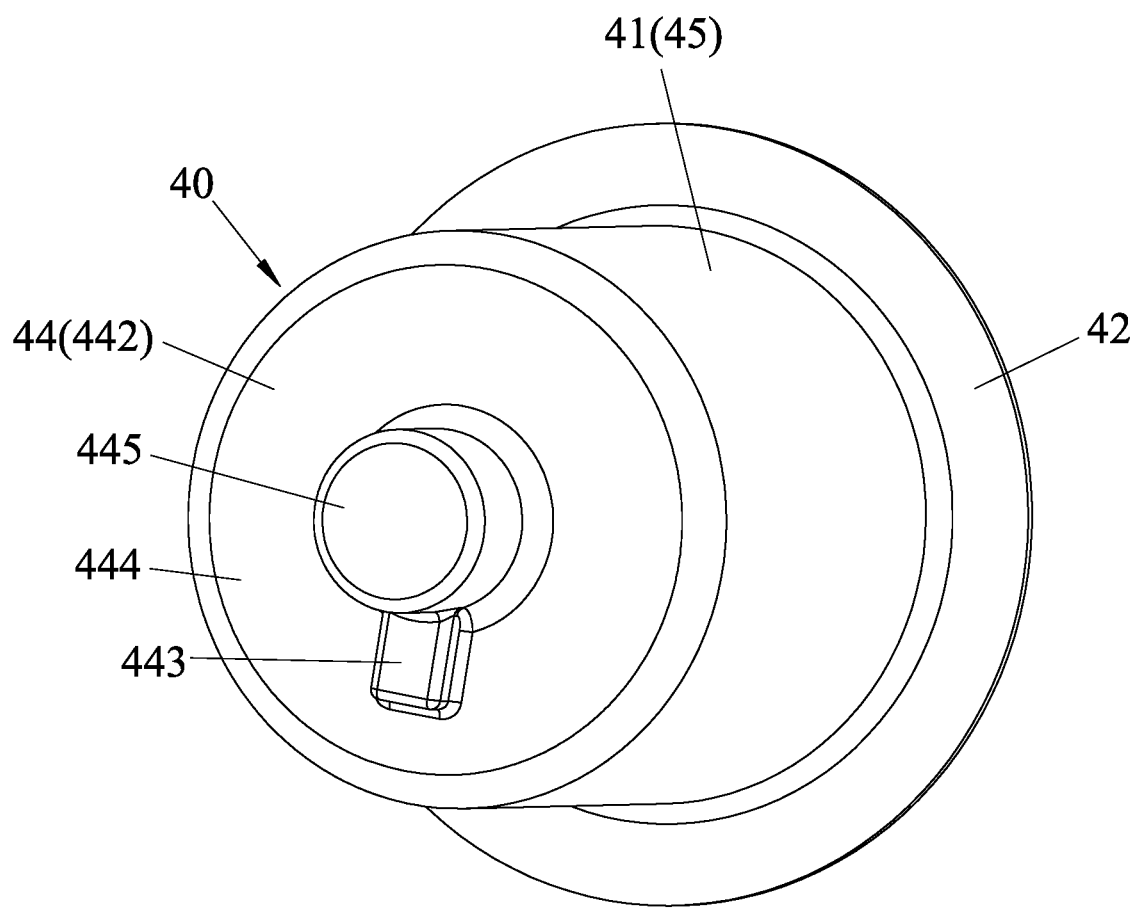
FIG. 3 is another perspective view of the rear cover of the embodiment.
Figure 4:
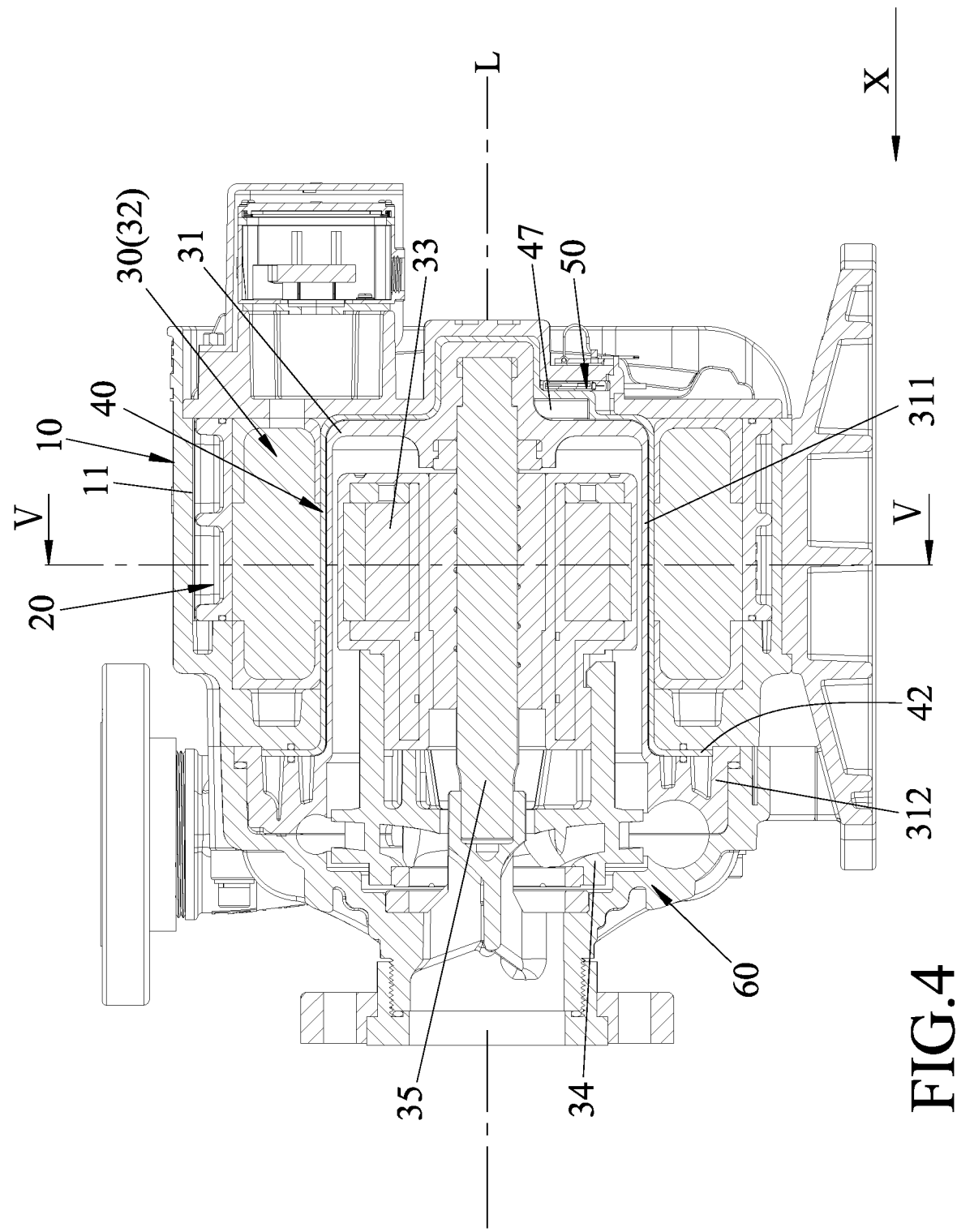
FIG. 4 is a sectional view of the embodiment.
Figure 5:
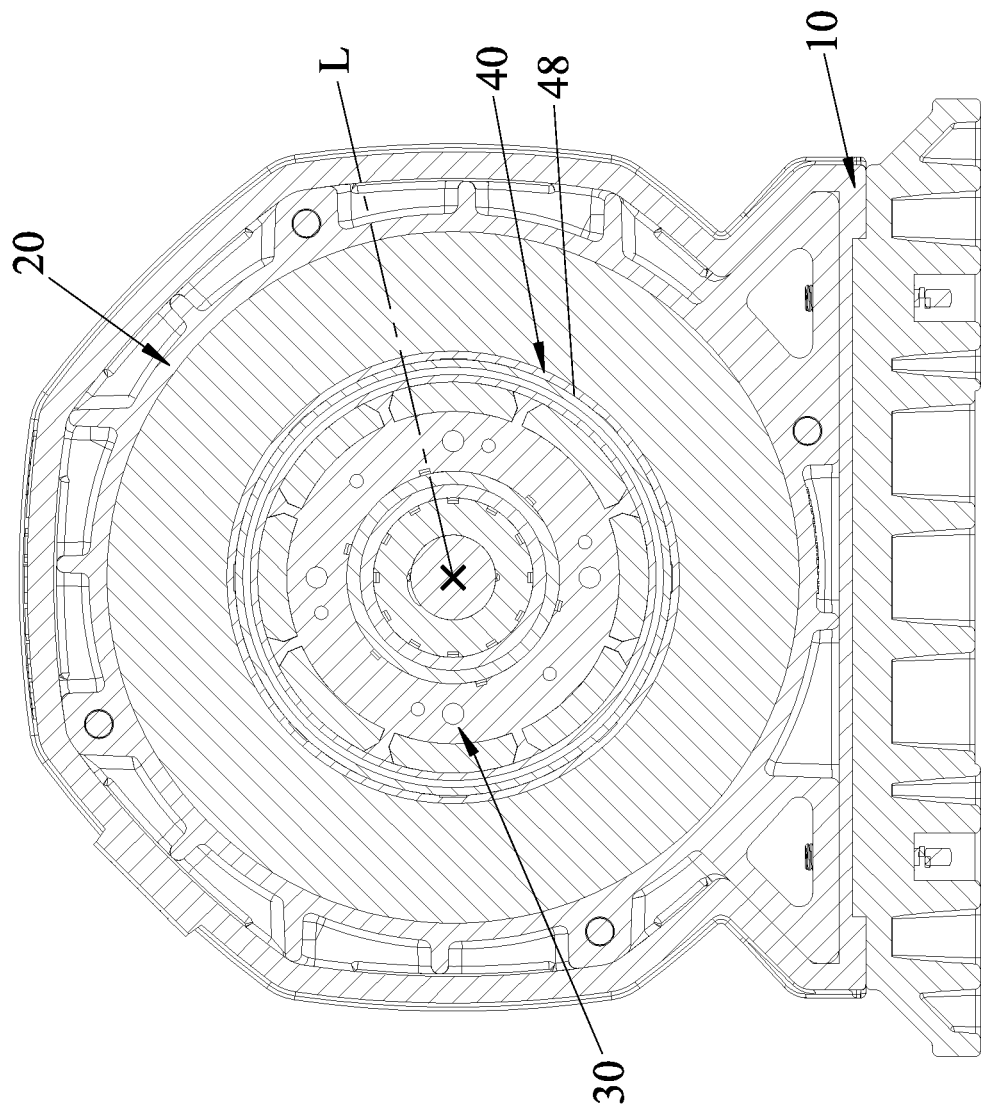
FIG. 5 is a sectional view taken long line V-V in FIG. 4.
Figure 6:
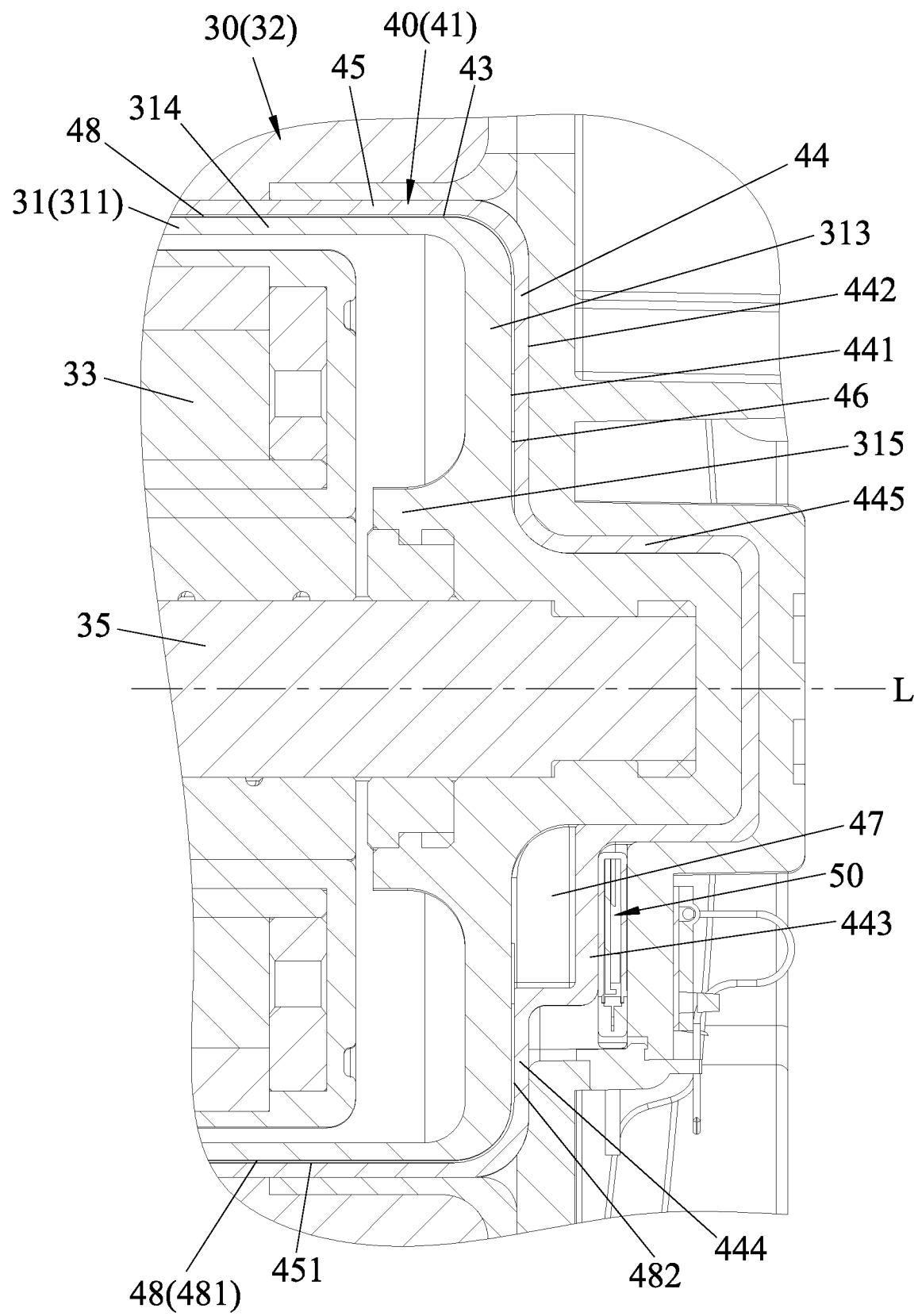
FIG. 6 is a fragmentary, enlarged view of FIG. 4.

Referring further to FIGS. 2 and 3, the rear cover 40 is mounted between the casing 31 and the tubular base 10 and has a main body portion 41 and an extended disk portion 42. The main body portion 41 is disposed between the casing body 311 of the casing 31 and the stator 32, and has two opposite ends in a direction (X) of the axis (L). The extended disk portion 42 extends from one of the opposite ends of the main body portion 41, and is clamped sealingly between the flange portion 312 of the casing 31 and the tubular base 10. The main body portion 41 and the extended disk portion 42 cooperatively define an accommodating space 43 which opens at the one of the opposite ends and in which the casing body 311 is disposed. The main body portion 41 has a cover end wall 44 and a cover surrounding wall 45. The cover end wall 44 is located at the other one of the opposite ends, and is more distal from the one of the opposite ends than the casing end wall 313 of the casing 31. The cover surrounding wall 45 surrounds the axis (L), surrounds the casing surrounding wall 314 of the casing 31, and extends from a periphery of the cover end wall 44 to the extended disk portion 42. The cover end wall 44 and the casing 31 cooperatively define an annular groove 46 that surrounds the axis (L), and a liquid-receiving space 47 therebetween. The rear cover 40 and the casing 31 cooperatively define a plurality of guiding grooves 48 therebetween that are disposed about the axis (L) and that are spaced apart from each other. Each of the guiding grooves 48 extends from the cover surrounding wall 45 to the cover end wall 44. The annular groove 46 and each of the guiding grooves 48 intersect. The annular groove 46 communicates with the liquid-receiving space 47, the accommodating space 43, and each of the guiding grooves 48.

The accommodating space 43 has a large-diameter section 431 and a small-diameter section 432. The cover end wall 44 has an inner side surface 441, an outer side surface 442, a protruding wall section 443, an annular section 444 and a cylindrical end section 445. The inner side surface 441 is adjacent to the accommodating space 43. The outer side surface 442 is opposite to the inner side surface 441 in the direction (X) of the axis (L). The protruding wall section 443 protrudes from the outer side surface 442 and away from the casing 31 of the motor unit 30, and corresponds in position to the liquid-receiving space 47. The annular section 444 is adjacent to the large-diameter section 431. The cylindrical end section 445 protrudes from the annular section 444 and away from the casing 31 along the axis (L), and has an inner surrounding surface that defines the small-diameter section 432 therein. The cover surrounding wall 45 defines the large-diameter section 431, and has a cover surrounding surface 451. The cover surrounding surface 451 is adjacent to the accommodating space 43 and is connected to the inner side surface 441. In this embodiment, the annular groove 46 is formed in the inner side surface 441 of the cover end wall 44. The liquid-receiving space 47 is formed in the inner side surface 441 and is formed through the inner surrounding surface of the cylindrical end section 445. The guiding grooves 48 are formed in the rear cover 40. Each of the guiding grooves 48 has an axial groove section 481 formed in the surrounding wall 45, and a radial groove section 482 formed in the annular section 444 and communicating with the axial groove section 481. Specifically, the axial groove section 481 and the radial groove section 482 of each of the guiding grooves 48 are respectively indented in the cover surrounding surface 451 and in the inner side surface 441.

The leak detector 50 is disposed on one side of the cover end wall 44 of the main body portion 41 that is opposite to the liquid-receiving space 47 for detecting a change in electrostatic capacity between the liquid-receiving space 47 and the leak detector 50. Specifically, the leak detector 50 is disposed on the outer side surface 442 of the cover end wall 44 and corresponds in position to the liquid-receiving space 47. In this embodiment, the leak detector 50 is a capacitive proximity sensor that can be short-circuited or open-circuited when it detects a certain level of electrostatic capacity.

The front cover 60 is positioned on the tubular base 10, covers the impeller 34, and cooperates with the tubular base 10 to sealingly clamp the extended disk portion 42 of the rear cover 40 and the flange portion 312 of the casing 31.

In this embodiment, the canned motor device further includes a positioning seat 20. The positioning seat 20 is made of a metal material, is tubular, is disposed in the mounting space 11 of the tubular base 10, and surrounds the motor unit 30. Specifically, the positioning seat 20 is sleeved on the stator 32.

In the following description, the advantages provided by structures of the embodiment of the canned motor device of the disclosure are described.

When the motor unit 30 is energized, the canned motor device may begin operating to pump liquids. When the canned motor device is in operation on a piece of chemical processing equipment, the leak detector 50 continuously detects whether a leakage has occurred according to a change in electrostatic capacity between the liquid-receiving space 47 and the leak detector 50. In the case that the casing body 311 of the casing 31 is damaged by being in frequent contact with chemical liquid over a long period of time, the chemical liquid may leak through a crack in the casing body 311. At this time, the leaked chemical liquid between the casing 31 and the rear cover 40 will be directed by the axial groove section 481 and the radial groove section 482 of each of the guiding grooves 48 to flow into the annular groove 46 and then into the liquid-receiving space 47. Because the liquid-receiving space 47 is able to collect the chemical liquid, the stator 32 of the motor unit 30 can be prevented from being immediately exposed to the leaked chemical liquid. Moreover, the presence of the chemical liquid in the liquid-receiving space 47 causes a change in electrostatic capacity between the liquid-receiving space 47 and the leak detector 50, and this change can be detected by the leak detector 50. As soon as the leak detector 50 detects the change, a control member (not shown) that is electronically connected to the leak detector 50 is able to alert a user about the leakage or to cease the operation of the motor unit 30. Thus, the stator 32 is prevented from being corroded by the chemical liquid, and the motor unit 30 will not malfunction.

Overall, by virtue of the guiding grooves 48 and the annular groove 46 that may instantly direct leaked chemical liquid between the casing 31 and the rear cover 40 to the liquid-receiving space 47, and by virtue of the leak detector 50 continuously detecting leakage according to the change in electrostatic capacity between the liquid-receiving space 47 and the leak detector 50, the canned motor device of the disclosure offers a design that is easy to assemble while providing reliable and instant leak detection.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A canned motor device comprising:
   a tubular base extending along and surrounding an axis to define a mounting space therein;
   a motor unit mounted in said mounting space and including
      a casing that has
         a casing body, and
         a flange portion connected to one end of said casing body and fixedly mounted to said tubular base,
      a stator that is sleeved on said casing,
      a rotor that is mounted in said casing body, and
      an impeller that is driven by said rotor;
   a rear cover mounted between said casing and said tubular base and having
      a main body portion that is disposed between said casing body and said stator and that has two opposite ends in a direction of the axis, and
      an extended disk portion that extends from one of said opposite ends of said main body portion, said main body portion and said extended disk portion cooperatively defining an accommodating space which opens at the one of said opposite ends and in which said casing body is disposed, said main body portion having
         a cover end wall that is located at the other one of said opposite ends, and
         a cover surrounding wall that surrounds the axis and that extends from a periphery of said cover end wall to said extended disk portion, said cover end wall and said casing cooperatively defining an annular groove that surrounds the axis, and a liquid-receiving space therebetween, said rear cover and said casing cooperatively defining a plurality of guiding grooves therebetween that are disposed about the axis and that are spaced apart from each other, each of said guiding grooves extending from said cover surrounding wall to said cover end wall, said annular groove and each of said guiding grooves intersecting, said annular groove communicating with said liquid-receiving space, said accommodating space, and each of said guiding grooves;
   a leak detector disposed on one side of said cover end wall that is opposite to said liquid-receiving space for detecting a change in electrostatic capacity between said liquid-receiving space and said leak detector; and
   a front cover positioned on said tubular base and covering said impeller.

2. The canned motor device as claimed in claim 1, wherein:
   said cover end wall of said rear cover has
      an inner side surface adjacent to said accommodating space,
      an outer side surface opposite to said inner side surface in the direction of the axis, and
      a protruding wall section protruding from said outer side surface and away from said casing of said motor unit, said protruding wall section corresponding in position to said liquid-receiving space, said leak detector being disposed on said outer side surface and corresponding in position to said liquid-receiving space;
   said annular groove is formed in said inner side surface of said cover end wall; and
   said guiding grooves are formed in said rear cover.

3. The canned motor device as claimed in claim 2, wherein:
   said accommodating space has a large-diameter section and a small-diameter section;
   said cover surrounding wall of said rear cover defines said large-diameter section;
   said cover end wall of said rear cover further has an annular section adjacent to said large-diameter section, and a cylindrical end section protruding from said annular section and away from said casing along the axis, and having an inner surrounding surface that defines said small-diameter section therein;
   said liquid-receiving space is formed in said inner side surface and formed through said inner surrounding surface of said cylindrical end section; and
   each of said guiding grooves of said rear cover has an axial groove section formed in said cover surrounding wall, and a radial groove section formed in said annular section and communicating with said axial groove section.

* * * * *